US008479766B2

(12) United States Patent
Hügel

(10) Patent No.: US 8,479,766 B2
(45) Date of Patent: Jul. 9, 2013

(54) ROTARY TRANSFER APPARATUS FOR TRANSFERRING DIFFERENT MEDIA AND PRINTING PRESS HAVING THE APPARATUS

(75) Inventor: Karlheinz Hügel, Heidelberg (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 596 days.

(21) Appl. No.: 12/700,790

(22) Filed: Feb. 5, 2010

(65) Prior Publication Data

US 2010/0242758 A1    Sep. 30, 2010

(30) Foreign Application Priority Data

Mar. 31, 2009 (DE) .......................... 10 2009 015 080

(51) Int. Cl.
*E03B 1/00* (2006.01)
*E03B 3/00* (2006.01)
*F16L 27/00* (2006.01)

(52) U.S. Cl.
USPC .......................................................... 137/580

(58) Field of Classification Search
USPC ................................................. 137/560, 580
See application file for complete search history.

(56) References Cited

U.S. PATENT DOCUMENTS

| | | | | |
|---|---|---|---|---|
| 3,851,663 A | * | 12/1974 | Neuko | 137/580 |
| 3,873,061 A | * | 3/1975 | Thylefors | 251/129.21 |
| 3,910,309 A | * | 10/1975 | Kaiser | 137/580 |
| 4,127,067 A | * | 11/1978 | Dahlgren et al. | 101/451 |
| 4,538,639 A | * | 9/1985 | Inaba et al. | 137/580 |
| 4,644,707 A | * | 2/1987 | Aubourg et al. | 52/65 |
| 4,836,112 A | * | 6/1989 | Moore | 101/486 |
| 5,110,159 A | | 5/1992 | Herold et al. | |
| 5,738,574 A | * | 4/1998 | Tolles et al. | 451/288 |
| 6,038,976 A | * | 3/2000 | Helmstadter et al. | 101/410 |
| 7,032,353 B2 | * | 4/2006 | Johnstone et al. | 52/65 |
| 7,537,512 B2 | * | 5/2009 | Seo | 451/41 |
| 7,703,461 B2 | * | 4/2010 | Furuya et al. | 134/95.1 |
| 7,934,450 B2 | | 5/2011 | Kuendgen et al. | |
| 8,042,466 B2 | | 10/2011 | Bechtler et al. | |
| 2002/0000251 A1 | * | 1/2002 | Suzuki et al. | 137/580 |
| 2007/0214980 A1 | | 9/2007 | Schafer | |
| 2008/0148974 A1 | | 6/2008 | Hugel et al. | |

FOREIGN PATENT DOCUMENTS

| | | |
|---|---|---|
| DE | 42 16 306 A1 | 11/1993 |
| DE | 10 2004 021 606 A1 | 12/2005 |
| DE | 10 2007 060 792 A1 | 6/2008 |
| EP | 0 435 164 A1 | 7/1991 |

OTHER PUBLICATIONS

German Patent and Trademark Office Search Report, dated Aug. 24, 2009.

* cited by examiner

*Primary Examiner* — Stephen M Hepperle
*Assistant Examiner* — Hailey K Do
(74) *Attorney, Agent, or Firm* — Laurence A. Greenberg; Werner H. Stemer; Ralph E. Locher

(57) ABSTRACT

An apparatus for transferring different media into a rotatably mounted component of a machine, such as a rotary leadthrough, includes a connection for introducing the media to a stator and through a rotor into the rotatably mounted component. The invention can be used, for example, on a plate cylinder of a printing press.

7 Claims, 2 Drawing Sheets

ROTARY TRANSFER APPARATUS FOR TRANSFERRING DIFFERENT MEDIA AND PRINTING PRESS HAVING THE APPARATUS

CROSS-REFERENCE TO RELATED APPLICATION

This application claims the priority, under 35 U.S.C. §119, of German Patent Application DE 10 2009 015 080.3, filed Mar. 31, 2009; the prior application is herewith incorporated by reference in its entirety.

BACKGROUND OF THE INVENTION

Field of the Invention

The invention relates to an apparatus for transferring different media into a rotatably mounted component of a machine. Apparatuses of that type are known as rotary leadthroughs and are used to provide a connection for introduction of the media to a stator and through a rotor into the rotatably mounted component. The invention also relates to a printing press having the apparatus.

Transfer apparatuses which are configured as so-called rotary transfer apparatuses are known from the prior art. There is, for example, European Patent EP 0 435 164 B1, corresponding to U.S. Pat. No. 5,110,159, in which a rotary transfer apparatus for introducing compressed air into a rotating part of a printing press is described. The apparatus is configured in such a way that a cylinder journal of the rotating part is extended and configured at the same time as a rotor. Channels are guided out of the interior of the rotatable part to the outside into the rotor. The channels are formed by radially and axially parallel bores and then end in a chamber. In embodiments having a multiplicity of channels, the chambers are separated from one another by correspondingly sealed anti-friction bearings. A supply of compressed air is provided from outside into the chambers.

Furthermore, German Published, Non-Prosecuted Patent Application DE 10 2007 060 792 A1, corresponding to U.S. Patent Application Publication No. US 2008/0148974, is known from the prior art. That document describes an apparatus for transferring or producing electrical energy or for transferring signals into a machine which processes printing materials. A rotationally movable component of a machine is driven by an electric motor which is situated directly on the shaft of the rotationally movably mounted component. Furthermore, apparatuses for transferring electrical energy or for transferring signals are disposed in a common housing.

A disadvantage of the previously known prior art is that different media cannot be transferred jointly.

SUMMARY OF THE INVENTION

It is accordingly an object of the invention to provide a rotary transfer apparatus for transferring different media and a printing press having the apparatus, which overcome the hereinafore-mentioned disadvantages of the heretofore-known apparatuses and printing presses of this general type and with which at least one further different medium can be transferred into a rotatably mounted component.

With the foregoing and other objects in view there is provided, in accordance with the invention, a rotary transfer apparatus for transferring compressed air or hydraulic fluid into a rotatably mounted component of a machine. The rotary transfer apparatus comprises a pressure-tight housing, a stationary part, a rotor, a connection guiding the compressed air or hydraulic fluid into the stationary part and through the rotor to the rotatably mounted component, and at least one additional component disposed in the pressure-tight housing for transferring at least one further medium.

The apparatus affords the advantage that, in addition to the transfer of compressed air, further media such as electrical energy, signals or data or drive energy can also be introduced into the rotatably mounted component. The basic advantage of the invention resides in it being possible for an additional component, which is responsible for introducing the further medium, to be accommodated in a pressure-tight housing.

If a corresponding space is provided for this purpose, the transfer of electrical energy or signals/data can be provided in it through the use of transfer apparatuses which have contacts or are contactless. The transfer of compressed air, as a result of which the pressure-tight housing is under positive pressure, does not generally disturb the additional component, since the air can flow around a component of this type. It is merely to be ensured that the compressed air is dry, which is usually prevented by corresponding precautions in a compressed-air supply.

Instead of a transfer apparatus for electrical energy, etc., a drive motor which moves the rotatably mounted component could also be accommodated in the pressure-tight housing. A direct drive which is attached on one of the cylinder journals of the rotatably mounted component would be advantageous in this case. However, it is to be ensured in this case that the feed lines of the drive motor are sealed when they are led through into the pressure-tight housing, so that there is no pressure loss.

A further possibility includes a gear mechanism being accommodated within the pressure-tight housing, in which the gear mechanism can also additionally be combined with the drive motor which is mentioned in the introduction. It is possibly to be ensured that very fine particles which are detached from the gear mechanism as a result of abrasion do not pass into the pneumatic system. To this end, the feed lines and discharge lines which supply the system with compressed air can be equipped with filters.

In addition to the actual object of the rotary transfer apparatus, namely the transfer of compressed air for a pneumatic system in the rotatably mounted component, a vacuum can also be active in the pressure-tight housing. That is to say, if a vacuum is required in the rotatably mounted component, a reversal of the pressure level can take place.

Furthermore, it is also conceivable that the transfer apparatus is used for transferring fluid, such as oil, for supplying a hydraulic system in the rotatably mounted component. If the hydraulic system in the rotatably mounted component has a restricted volume, a single-channel configuration is also conceivable in this case. That is to say, the pressure which is applied from outside ensures that a hydraulically moving actuating element performs a function in the rotatably mounted component. If a restoring movement is to take place, the pressure is canceled and a mechanical spring in the hydraulic actuating element ensures that the latter assumes its initial position again. The oil is pressed back through the use of the spring. However, it would also be conceivable that the introduced oil is not provided for supplying a hydraulic system, but rather for cooling a cylinder which in this case represents the rotatably mounted component. In a configuration of this type, however, the introduced oil has to be able to flow through the cylinder and exit the cylinder again. In this case, an outlet opening on the opposite cylinder side would be conceivable.

As described in the introduction, a drive motor for the rotatably mounted component could be accommodated in the pressure-tight housing. There are motors which can be oil-cooled in the actual operating case, in order to increase performance, or in order to achieve a smaller overall size with the same performance in comparison with noncooled motors. Motors of this type could be used when the cylinder is cooled, as described above.

However, it is also conceivable that the drive motor which is situated in the pressure-tight housing is operated hydraulically. To this end, the hydraulic fluid is introduced, as is provided for the compressed air, but a return line on the housing is required, through which the hydraulic fluid which has driven the motor is guided out of the pressure-tight housing again.

With the objects of the invention in view, there is concomitantly provided a printing press comprising the apparatus according to the invention. It is possible for the rotatable component to be a cylinder or a drum. The cylinder can, in particular, be a so-called plate cylinder, on which a printing plate is clamped. The introduced compressed air can be used for controlling clamping devices, through which the printing plate is clamped. In an application of this type, the additionally introduced energy can be used for the supply of actuating motors which are situated in the plate cylinder. For an application in which different pneumatic components situated in the cylinder are to be actuated differently, there is provision for the additional component in the pressure-tight housing to be a transfer apparatus for signals/data which has contacts or is contactless. A controller which controls the actuation of the different pneumatic components can therefore be supplied in the cylinder. However, the same could also be provided on a paper-conveying drum in a printing press.

Other features which are considered as characteristic for the invention are set forth in the appended claims.

Although the invention is illustrated and described herein as embodied in a rotary transfer apparatus for transferring different media and a printing press having the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
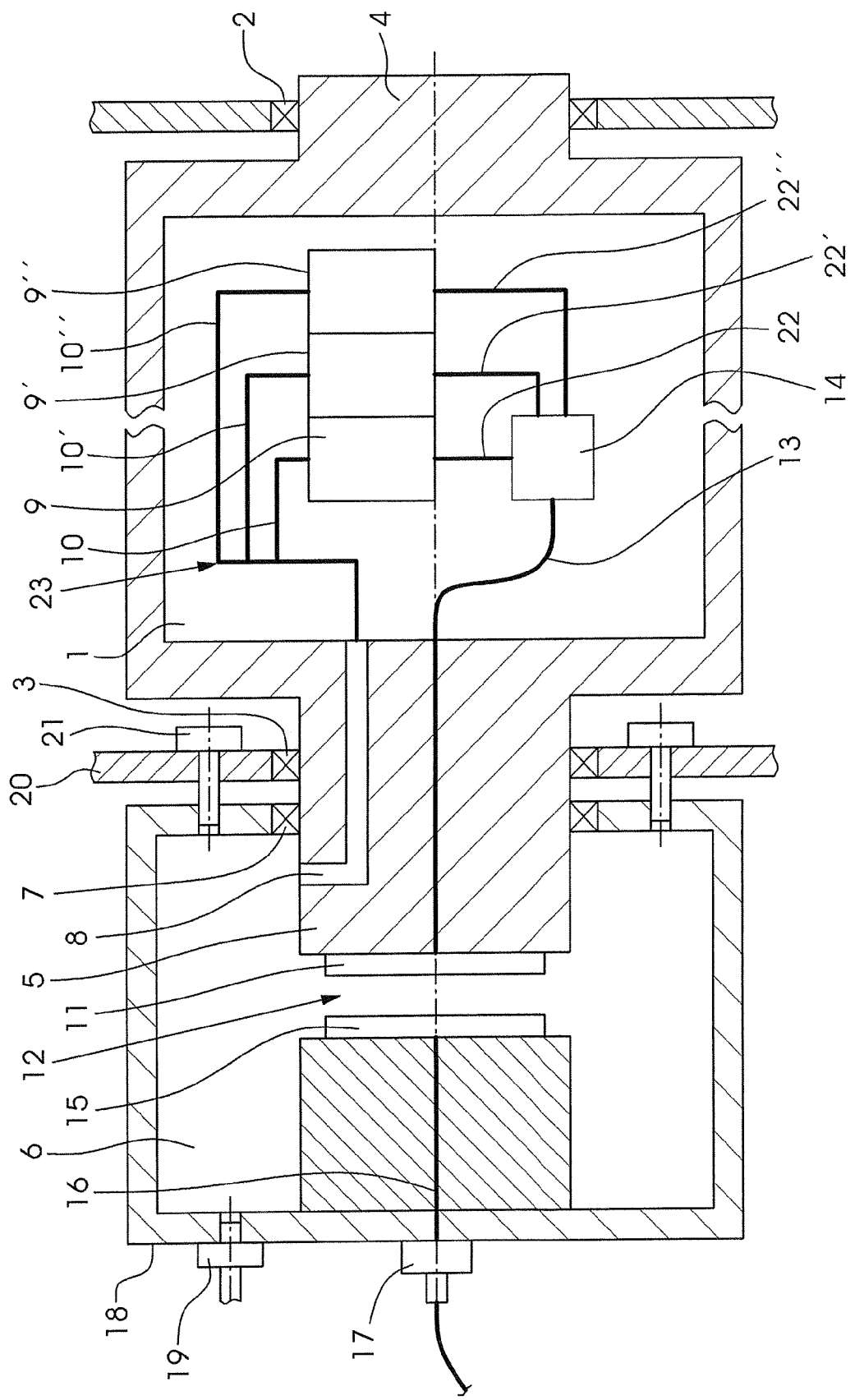
FIG. 1 is a fragmentary, diagrammatic, longitudinal-sectional view of a rotary leadthrough.

Referring now to the figures of the drawings in detail and first, particularly, to FIG. 1 thereof, there is seen a rotatably mounted component 1 which is mounted rotatably between two bearings 2 and 3. Each of the bearings 2 and 3 support a respective cylinder journal 4, 5, between which the rotatably mounted component 1 is situated. The cylinder journal 5 opens into a pressure-tight housing 6. A bearing 7 disposed between the pressure-tight housing 6 and the cylinder journal 5, ensures an unrestricted rotational movement of the cylinder journal 5 in the pressure-tight housing 6 and ensures a sealing action. Firstly, a bore 8 which is situated in the cylinder journal 5 guides compressed air, for example, through the bore 8 and out of the interior of the pressure-tight housing 6 to a pneumatic system 9. One end of the bore 8 is connected to the pneumatic system 9 by a line 10. Secondly, a rotating part or rotor 11 of a transfer apparatus 12 is situated on the cylinder journal 5. A line 13 is guided from this rotating part 11 of the transfer apparatus 12 through the cylinder journal 5 to an electrical system 14 in the rotatably mounted component 1. The electrical system 14 can be a controller, an actuating motor, a data processing unit or the like.

A stationary part 15 of the transfer apparatus 12, which is connected over a line 16 to a plug element 17 that is situated on an outer side 18 of the pressure-tight housing 6, is situated opposite the rotating part 11 of the transfer apparatus 12. Depending on requirements, the transfer apparatus 12 can be contactless or can have contacts, with corresponding sliding contacts being required in the case where the transfer apparatus 12 has contacts. The sliding contacts are not shown, since that part is not considered to be relevant to the invention.

Furthermore, a connection 19 for the supply of compressed air is situated on the outer side 18 of the pressure-tight housing 6. If the compressed air is guided into the pressure-tight housing 6, the compressed air passes through the rotating bore 8 to the pneumatic system 9. In order to ensure that the pressure-tight housing 6 is not corotated by the rotating cylinder journal 5, the pressure-tight housing 6 is fixed through the use of screws 21 on a frame wall 20 which holds the bearing 3.

For the case in which the pneumatic system 9 includes a plurality of components or systems 9, 9' and 9", there is provision for the electrical system 14 to assume the actuation of the individual pneumatic systems 9, 9', 9". In this case, the electrical system 14 is a controller, from which actuating lines 22, 22', 22" are connected to the pneumatic systems 9, 9', 9". In this case, the supply of compressed air is brought about through lines 10, 10', 10" which are connected to a distributor 23.

Figure 2:
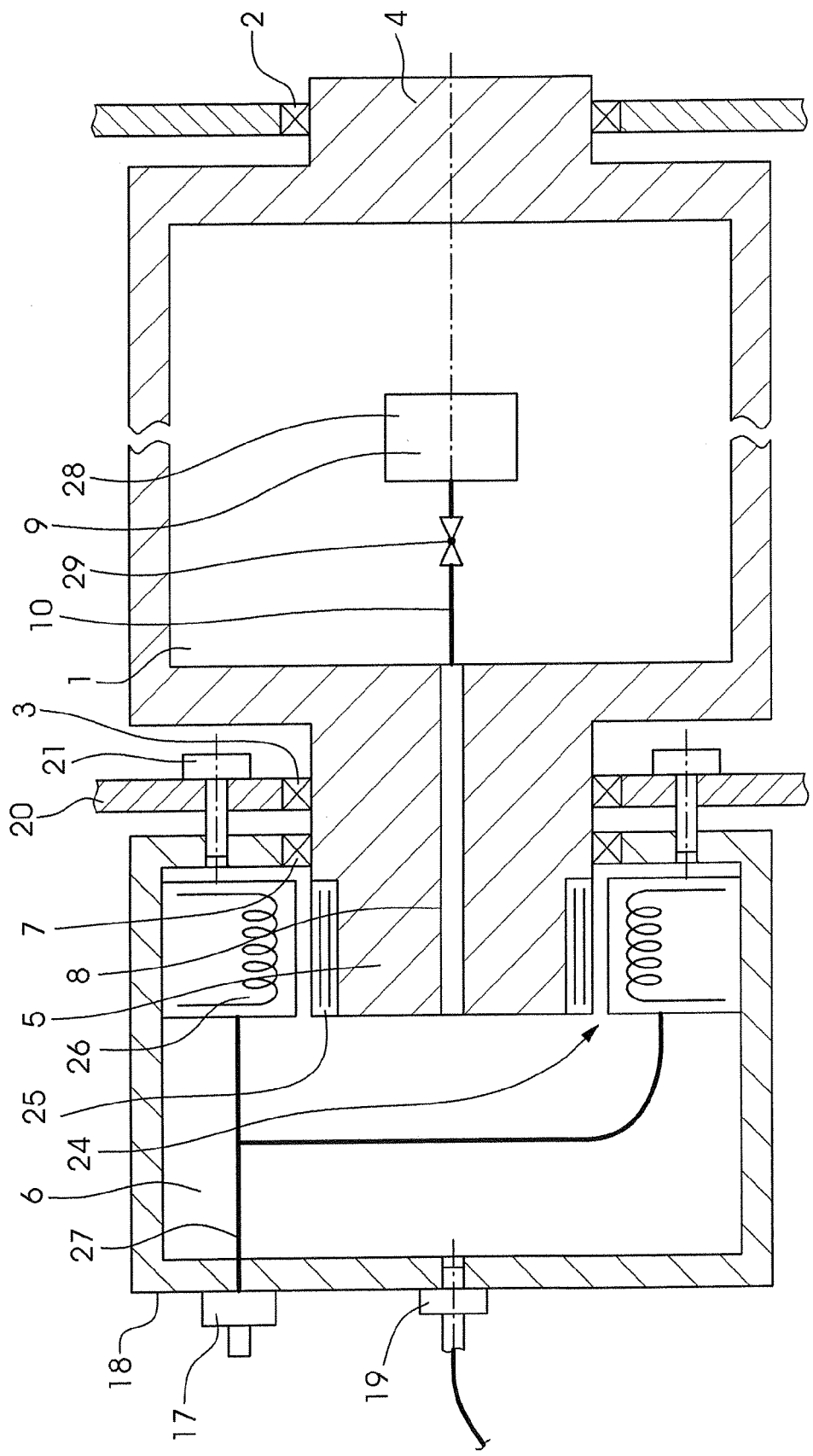
FIG. 2 is a longitudinal-sectional view of a rotary leadthrough having an additional drive motor.

FIG. 2 shows an illustration of a rotary leadthrough, into which a drive motor 24 for the rotatably mounted component 1 is integrated. The drive motor is constructed as a brushless motor, having magnets 25 which are integrated into the cylinder journal 5 and rotate within a magnetic field which is built up by coils 26. The coils 26 are supplied with current through lines 27. In addition, signals which are necessary to actuate the coils 26 can be sent over the lines 27. The cylinder journal 5 is provided with a bore 8 which opens at one end into a line 10. The line 10 supplies a pneumatic system 9 which is fed from a connection 19. The pressure then propagates in the interior of the pressure-tight housing 6 and passes through the bore 8 and the line 10 to the pneumatic system 9. The pressure-tight housing 6 is mounted and sealed with respect to the cylinder journal 5 by a bearing 7. The pressure-tight housing 6 is fixed against rotation on the frame wall 20 through the use of screws 21.

As an alternative, hydraulic fluid can also be fed-in in the connection 19, if the interior of the rotatably mounted component 1 is a hydraulic system 28. The hydraulic fluid then propagates in a similar way and passes to the hydraulic system 28. A controllable valve 29 is provided for regulating the pressure which is introduced into the hydraulic system 28. An advantage of the introduction of hydraulic fluid is that it simultaneously damps oscillations which result in the rotatably mounted component or are transmitted by it.

The invention claimed is:

1. A rotary transfer apparatus for transferring compressed air or hydraulic fluid into a rotatably mounted component of a machine, the rotary transfer apparatus comprising:
   a pressure-tight housing having a pressure-tight interior space;
   a stationary part;
   a rotor;
   a connection guiding the compressed air or hydraulic fluid into said pressure-tight interior space and through said rotor to said rotatably mounted component; and
   at least one additional component disposed in said pressure-tight interior space for transferring at least one further medium, said additional component being provided for transferring electrical energy or electrical data.

2. The rotary transfer apparatus according to claim 1, wherein said pressure-tight housing is under positive pressure.

3. The rotary transfer apparatus according to claim 1, wherein said pressure-tight housing is under vacuum.

4. A rotary transfer apparatus for transferring compressed air or hydraulic fluid into a rotatably mounted component of a machine, the rotary transfer apparatus comprising:
   a pressure-tight housing having a pressure-tight interior space;
   a stationary part;
   a rotor;
   a connection guiding the compressed air or hydraulic fluid into said pressure-tight interior space and through said rotor to said rotatably mounted component; and
   at least one additional component disposed in said pressure-tight interior space for transferring at least one further medium, said additional component being a drive motor serving to introduce drive energy.

5. The rotary transfer apparatus according to claim 1, wherein the transferred hydraulic fluid is provided for cooling the rotatably mounted component.

6. The rotary transfer apparatus according to claim 5, which further comprises a controllable valve for introducing the hydraulic fluid into the rotatably mounted component.

7. A printing press, comprising an apparatus according to claim 1.

* * * * *